(12) United States Patent
Kim et al.

(10) Patent No.: US 11,545,707 B2
(45) Date of Patent: Jan. 3, 2023

(54) BATTERY CASE COMPRISING VARIOUS KINDS OF METAL BARRIER LAYERS AND BATTERY CELL INCLUDING THE SAME

(71) Applicant: LG Chem, Ltd., Seoul (KR)

(72) Inventors: Sang Hun Kim, Daejeon (KR); Yong Kim, Daejeon (KR); Yong Su Choi, Daejeon (KR); Hyung Kyun Yu, Daejeon (KR); Soo Ji Hwang, Daejeon (KR); Na Yoon Kim, Daejeon (KR); Min Hyeong Kang, Daejeon (KR)

(73) Assignee: LG Energy Solution, Ltd.

( * ) Notice: Subject to any disclaimer, the term of this patent is extended or adjusted under 35 U.S.C. 154(b) by 549 days.

(21) Appl. No.: 16/497,532

(22) PCT Filed: Jul. 5, 2018

(86) PCT No.: PCT/KR2018/007616
§ 371 (c)(1),
(2) Date: Sep. 25, 2019

(87) PCT Pub. No.: WO2019/078448
PCT Pub. Date: Apr. 25, 2019

(65) Prior Publication Data
US 2020/0295316 A1 Sep. 17, 2020

(30) Foreign Application Priority Data

Oct. 17, 2017 (KR) .................. 10-2017-0134313

(51) Int. Cl.
*B32B 3/24* (2006.01)
*H01M 50/124* (2021.01)
(Continued)

(52) U.S. Cl.
CPC ............. *H01M 50/124* (2021.01); *B32B 7/12* (2013.01); *B32B 15/08* (2013.01);
(Continued)

(58) Field of Classification Search
CPC .................................................. H01M 50/124
See application file for complete search history.

(56) References Cited

U.S. PATENT DOCUMENTS 3,210,840 A  10/1965 Ulam
3,630,694 A  12/1971 Enright et al.
(Continued)

FOREIGN PATENT DOCUMENTS

CN  103907219 A  7/2014
CN  104094449 A  10/2014
(Continued)

OTHER PUBLICATIONS

Chinese Search Report for CN Application No. 201880014293.5 dated Aug. 6, 2021, 4 pgs.
(Continued)

*Primary Examiner* — William P Watkins, III
(74) *Attorney, Agent, or Firm* — Lerner, David, Littenberg, Krumholz & Mentlik, LLP

(57) ABSTRACT

Disclosed herein is a pouch-shaped battery case configured to receive an electrode assembly having a separator interposed between positive and negative electrodes, together with an electrolytic solution, the pouch-shaped battery case including an outer coating layer defining an outer surface of the battery case and configured to protect the electrode assembly from an outside of the battery case, the outer coating layer made of a polymer resin, a metal barrier layer located between the outer coating layer and an inner surface of the battery case, the metal barrier layer having high moisture-blocking efficiency and high thermal conductivity, and an inner sealant layer located between the metal barrier layer and an inner surface of the battery case, the inner sealant layer made of a polymer resin that has high thermal fusibility, the metal barrier layer includes a first metal that has high formability and a second metal that has high rigidity.

11 Claims, 4 Drawing Sheets

(51) Int. Cl.
    *B32B 7/12* (2006.01)
    *B32B 15/08* (2006.01)
    *H01M 10/0525* (2010.01)
    *H01M 50/116* (2021.01)

(52) U.S. Cl.
    CPC ..... *H01M 10/0525* (2013.01); *H01M 50/116* (2021.01); *B32B 2307/302* (2013.01); *B32B 2307/7265* (2013.01); *B32B 2311/24* (2013.01); *B32B 2311/30* (2013.01); *B32B 2457/10* (2013.01)

(56) References Cited

U.S. PATENT DOCUMENTS

| | | | |
|---|---|---|---|
| 9,623,629 | B2 | 4/2017 | Kuramoto et al. |
| 9,662,858 | B1 | 5/2017 | Kuramoto et al. |
| 2012/0058360 | A1 | 3/2012 | Oda et al. |
| 2013/0093398 | A1 | 4/2013 | Takabayashi et al. |
| 2014/0134475 | A1 | 5/2014 | Kuramoto et al. |
| 2014/0255765 | A1 | 9/2014 | Akita et al. |
| 2014/0335404 | A1 | 11/2014 | Takada |
| 2015/0367601 | A1 | 12/2015 | Ando et al. |
| 2017/0110694 | A1 | 4/2017 | Wang et al. |
| 2017/0179444 | A1 | 6/2017 | Kuramoto et al. |
| 2017/0346047 | A1 | 11/2017 | Muroi |

FOREIGN PATENT DOCUMENTS

| | | |
|---|---|---|
| CN | 105336883 A | 2/2016 |
| CN | 105914306 A | 8/2016 |
| CN | 106876614 A | 6/2017 |
| CN | 107123755 A | 9/2017 |
| JP | 2001266805 A | 9/2001 |
| JP | 2005183051 A | 7/2005 |
| JP | 2006117990 A | 5/2006 |
| JP | 2006324108 A | 11/2006 |
| JP | 2013222687 A | 10/2013 |
| JP | 2014086361 A | 5/2014 |
| JP | 2016171091 A | 9/2016 |
| KR | 20060059688 A | 6/2006 |
| KR | 20090038117 A | 4/2009 |
| KR | 20130005886 A | 1/2013 |
| KR | 20140007931 A | 1/2014 |
| KR | 101384901 B1 | 4/2014 |
| KR | 20160012368 A | 2/2016 |
| KR | 20170009495 A | 1/2017 |
| KR | 20170064553 A | 6/2017 |
| WO | 2012169055 A1 | 12/2012 |

OTHER PUBLICATIONS

Extended European Search Report with Written Opinion for Application No. 18867898.1 dated May 20, 2020, 8 pages.
Imaizumi, "Welding of Aluminium to Dissimilar Metals," Welding International, Jan. 1, 1996, pp. 593-604, vol. 10, No. 8, Taylor & Francis, Abingdon, GB. XP000598882.
International Search Report for Application No. PCT/KR2018/007616, dated Oct. 17, 2018, pp. 1-2.

[FIG. 1]
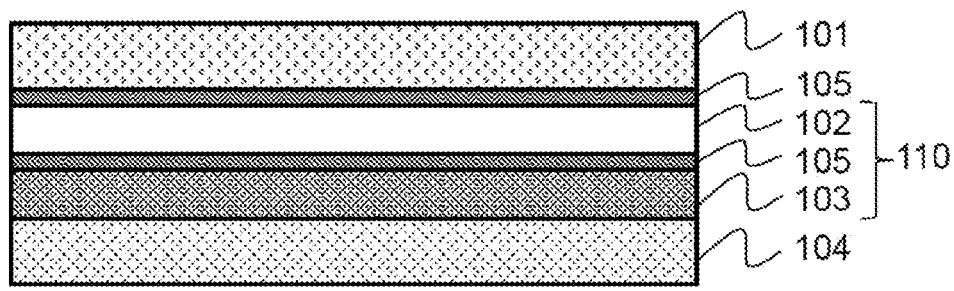
[FIG. 2]
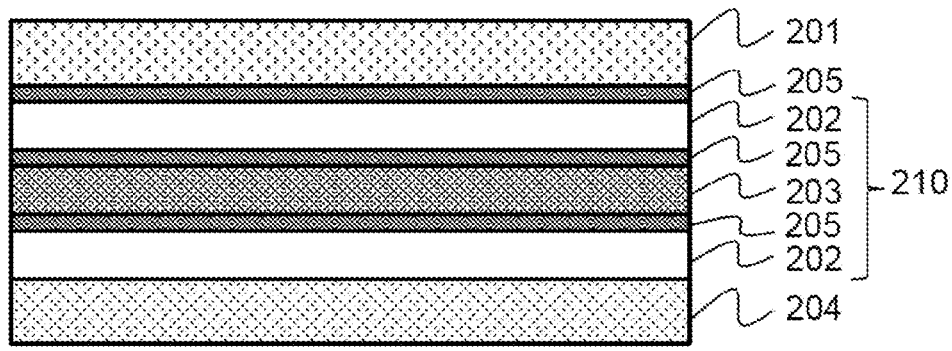

【FIG. 3】
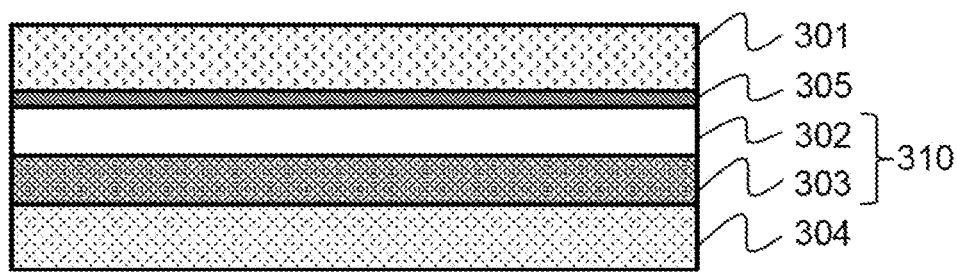
【FIG. 4】
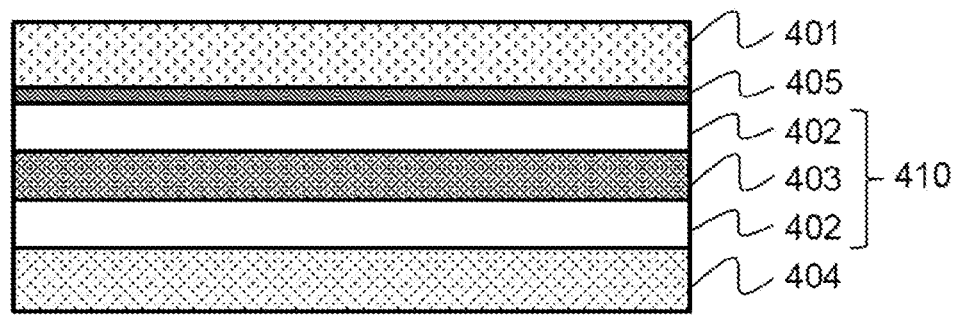

[FIG. 5]
500
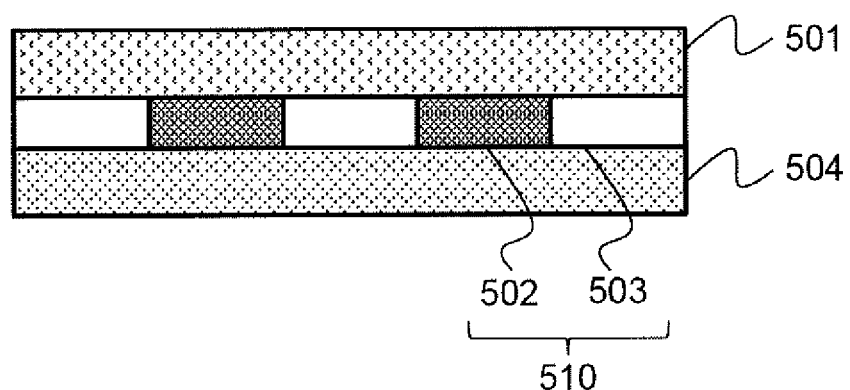
[FIG. 6]
600
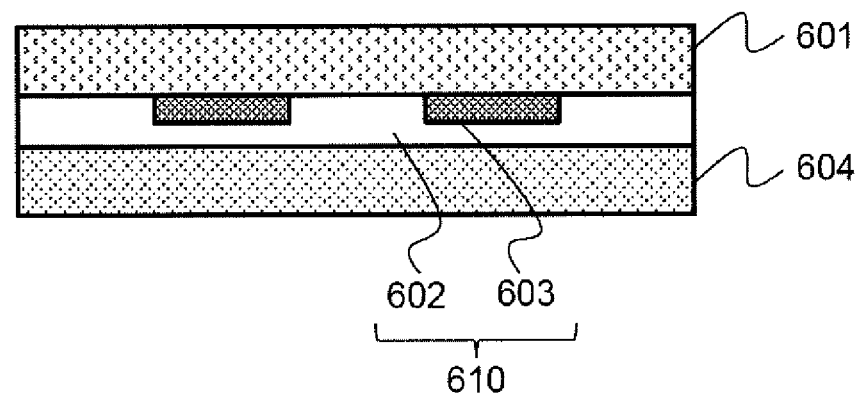

[FIG. 7]
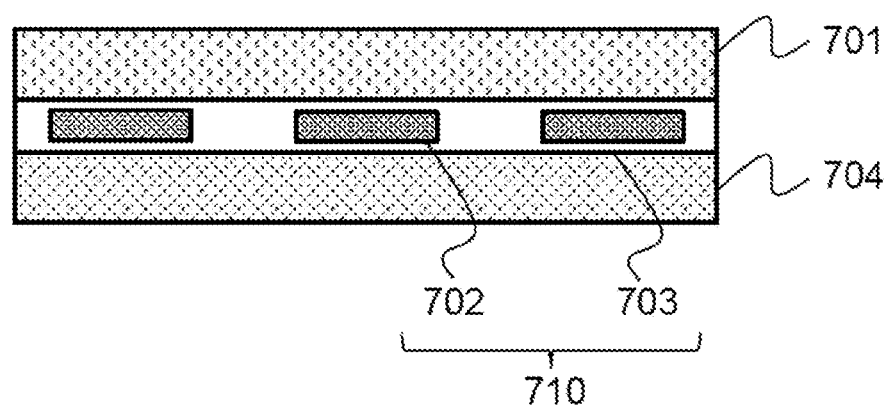

BATTERY CASE COMPRISING VARIOUS KINDS OF METAL BARRIER LAYERS AND BATTERY CELL INCLUDING THE SAME

CROSS-REFERENCE TO RELATED APPLICATIONS

This application is a national phase entry under 35 U.S.C. § 371 of International Application No. PCT/KR2018/007616, filed on Jul. 5, 2018, which claims priority to Korean Patent Application No. 10-2017-0134313, filed on Oct. 17, 2017, the disclosures of which are hereby incorporated by reference herein in their entireties.

TECHNICAL FIELD

The present invention relates to a battery case including various kinds of metal barrier layers and a battery cell including the same, and more particularly to a pouch-shaped battery case including an outer coating layer, a metal barrier layer, and an inner sealant layer, wherein the metal barrier layer includes a first metal that exhibits high formability and a second metal that exhibits high rigidity.

BACKGROUND ART

As the demand for mobile devices has increased, various kinds of batteries capable of satisfying various needs have been developed. In terms of the shape of batteries, the demand for prismatic secondary batteries or pouch-shaped secondary batteries that are thin enough to be applied to products such as cellular phones is very high. In terms of the material for batteries, on the other hand, the demand for lithium secondary batteries, such as lithium ion batteries or lithium ion polymer batteries, which exhibit high energy density, discharge voltage, and output stability, is also very high.

In addition, a lot of interest has been directed to a pouch-shaped battery configured to have a structure in which a stacked or stacked/folded type electrode assembly is mounted in a pouch-shaped battery case formed of a laminated aluminum sheet because of low manufacturing costs, light weight, easy modification of the shape thereof, etc. Furthermore, the use of such a pouch-shaped battery has gradually increased.

In general, a pouch-shaped battery is a battery configured to have a structure in which an electrode assembly is received in a pouch-shaped battery case, formed of a laminate sheet including a resin layer and a metal layer, together with an electrolyte in a sealed state. The electrode assembly received in the battery case may be a jelly-roll type (wound type) electrode assembly or a stacked type electrode assembly.

It is required for the pouch-shaped battery case to exhibit high formability such that the area and depth of an electrode assembly reception unit are increased in order to increase the capacity of the battery. For this reason, a barrier layer of the pouch-shaped battery case is made of aluminum foil, which exhibits high ductility and malleability.

In the case in which the aluminum foil is used, however, when a sealed portion of the battery case is bent, the bent sealed portion is easily broken, whereby reliability in sealing of the battery case is lowered.

Korean Patent Application Publication No. 2013-0005886 discloses a battery case for secondary batteries including an inner coating layer, a first barrier layer, which is made of aluminum, a first polymer layer, a second barrier layer, which has a thickness equal to or less than 50% of the thickness of the first barrier layer and which is made of an aluminum alloy, and a second polymer layer. Even in the case in which the first barrier layer is damaged, it is possible for the second barrier layer to prevent external moisture from being introduced into the battery case. However, there are limitations in the extent to which the mechanical strength of the battery case can be improved.

Japanese Patent Application Publication No. 2006-117990 discloses a battery case manufactured by shaping a stainless steel sheet configured to have a structure in which a nickel layer is coated on one surface of the stainless steel sheet and an aluminum layer is coated on the other surface of the stainless steel sheet. However, the disclosed battery case is a battery case for prismatic batteries. Consequently, this publication does not disclose technology that is capable of improving the strength of a pouch-shaped battery case.

Therefore, there is an urgent necessity for technology that is capable of improving the formability of a pouch-shaped battery case while improving the rigidity of the pouch-shaped battery case in order to manufacture a high-capacity secondary battery using the pouch-shaped battery case.

DISCLOSURE

Technical Problem

The present invention has been made in view of the above problems and other technical problems that have yet to be resolved, and it is an object of the present invention to provide a pouch-shaped battery case configured to have a structure in which an outer coating layer for protecting a battery cell from the outside, a metal barrier layer exhibiting high moisture-blocking efficiency and thermal conductivity, and an inner sealant layer made of a polymer resin that exhibits high thermal fusibility are sequentially stacked, wherein the metal barrier layer includes a first metal that exhibits high formability and a second metal that exhibits high rigidity. In this case, the formability of the battery case is improved due to the first metal, whereby it is possible to form an electrode assembly reception unit having a large depth and to manufacture a high-capacity battery. In addition, the rigidity of the battery case is improved due to the second metal, whereby it is possible to reinforce the rigidity of the metal barrier layer, which has become thin as the result of forming a deep electrode assembly reception unit. Furthermore, even when a sealed portion of the battery case is bent, it is possible to prevent the bent sealed portion from being easily broken.

Technical Solution

In accordance with an aspect of the present invention, the above and other objects can be accomplished by the provision of a pouch-shaped battery case configured to receive an electrode assembly having a separator interposed between a positive electrode and a negative electrode, together with an electrolytic solution, the pouch-shaped battery case including an outer coating layer defining the outer surface of the battery case and configured to protect the electrode assembly from an outside of the battery case, the outer coating layer being made of a polymer resin, a metal barrier layer located between the outer coating layer and an inner surface of the battery case, the metal barrier layer having high moisture-blocking efficiency and high thermal conductivity, and an inner sealant layer located between the metal barrier layer and an inner surface of the battery case, the inner sealant layer being made of a polymer resin that has high thermal fusibility, wherein the metal barrier layer includes a first metal that has high formability and a second metal that has high rigidity.

In general, a laminate sheet, of which the pouch-shaped battery case is made, includes an outer coating layer constituting the outermost layer of the battery case, a metal barrier layer for preventing foreign matter from being introduced into the battery case, and an inner sealant layer for sealing the battery case.

The outer coating layer serves to protect a battery from the outside. For this reason, it is required for the outer coating layer to exhibit excellent tensile strength for a given thickness, as well as high weather resistance. To this end, the outer coating layer is usually made of oriented nylon film. The metal barrier layer serves to prevent air or moisture from being introduced into the battery. The metal barrier layer is usually made of aluminum.

The inner sealant layer serves to seal the battery case, which is achieved as the result of being thermally fused by heat and pressure applied thereto in the state in which the electrode assembly is mounted in the battery case. The inner sealant layer is usually made of cast polypropylene (CPP) film. An adhesive layer may be further interposed between the outer coating layer and the metal barrier layer and/or between the metal barrier layer and the inner sealant layer. The adhesive layer serves to supplement the low force of adhesion between the layers disposed on opposite surfaces of the adhesive layer.

The pouch-shaped battery case according to the present invention includes a metal barrier layer including a first metal that exhibits high formability and a second metal that exhibits high rigidity. Consequently, it is possible to manufacture a battery case with improved formability that is capable of receiving a thick electrode assembly in order to satisfy the demand for high-capacity secondary batteries.

In addition, since the second metal exhibiting high rigidity is included, it is possible to prevent foreign matter from being introduced into the battery case even in the case in which the thickness of the battery case is reduced due to formation of the electrode assembly reception unit, compared to a conventional battery case including only a metal that exhibits high ductility and formability. Furthermore, it is possible to prevent the battery case from being broken even when mechanical stress is applied to the battery case. Consequently, it is possible to provide a battery case having improved sealability.

The first metal is not particularly restricted, as long as the first metal exhibits high formability and ductility. For example, the first metal may be aluminum or an aluminum alloy. The second metal is not particularly restricted, as long as the second metal exhibits high rigidity. For example, the second metal may be a stainless-steel-based material.

The metal barrier layer may be constituted by a first metal layer including the first metal and a second metal layer including the second metal.

Specifically, the first metal layer may be a metal layer including the first metal as the main component, and the second metal layer may be a metal layer including the second metal as the main component. The first metal layer and the second metal layer may be disposed so as to have a layered structure, in which the first metal layer and the second metal layer are stacked in the vertical direction. Alternatively, the first metal layer and the second metal layer may be alternately arranged in the horizontal direction.

In a concrete example, an adhesive layer may be interposed between the first metal layer and the second metal layer. That is, in the case in which the first metal layer and the second metal layer are disposed so as to have a layered structure, in which the first metal layer and the second metal layer are stacked in the vertical direction, and also in the case in which the first metal layer and the second metal layer are alternately arranged in the horizontal direction, the adhesive layer is interposed between opposite surfaces of the first metal layer and the second metal layer.

The metal barrier layer may include a plurality of first metal layers and/or second metal layers. Consequently, it is possible to form a metal barrier layer including two or more first metal layers and/or two or more second metal layers, wherein the first metal layers and the second metal layers are arranged so as to be adjacent to each other.

In another concrete example, the metal barrier layer may be configured to have a clad structure in which the first metal and the second metal are joined to each other by rolling.

In this case, the first metal and the second metal may be joined to each other by rolling without providing an additional adhesive layer between the first metal layer and the second metal layer.

Specifically, the metal barrier layer may be configured to have a structure in which the first metal and the second metal are stacked in the thickness direction of the battery case and are arranged in the state of being joined to each other. Alternatively, the metal barrier layer may be configured to have a structure in which another first metal is further joined to one surface of the second metal, to the other surface of which the first metal is joined in the thickness direction. As another alternative, the metal barrier layer may be configured to have a structure in which another second metal is further joined to one surface of the first metal, to the other surface of which the second metal is joined in the thickness direction.

In another concrete example, the metal barrier layer may be configured to have a structure in which first metals and second metals are alternately arranged in the state of being joined to each other in the width direction of the battery case, which is perpendicular to the thickness direction of the battery case, may be configured to have a structure in which another first metal is further joined to one surface of the second metal, to the other surface of which the first metal is joined in the thickness direction, or may be configured to have a structure in which another second metal is further joined to one surface of the first metal, to the other surface of which the second metal is joined in the thickness direction.

The metal barrier layer having the clad structure may be configured to have a structure in which the second metal is disposed in a portion of the first metal. For example, the metal barrier layer may be configured to have a structure in which a recess is formed in the surface of the first metal and in which the second metal is disposed in the recess. Alternatively, the metal barrier layer may be configured to have a structure in which a recess is formed in the surface of the second metal and in which the first metal is disposed in the recess.

As another alternative, the metal barrier layer may be configured to have a structure in which a slit is formed in the first metal and in which the second metal is disposed in the slit. As a further alternative, the metal barrier layer may be configured to have a structure in which a slit is formed in the second metal and in which the first metal is disposed in the slit.

An adhesive layer may be interposed between the outer coating layer and the metal barrier layer and/or between the metal barrier layer and the inner sealant layer. Consequently, it is possible to supplement the low force of coupling between the outer coating layer and the metal barrier layer or between the metal barrier layer and the inner sealant layer.

In accordance with other aspects of the present invention, there are provided a battery cell having an electrode assembly received in the pouch-shaped battery case together with an electrolytic solution and a battery pack including the battery cell.

Specifically, the battery pack may be used as a power source for a device requiring the ability to withstand high temperatures, a long lifespan, high rate characteristics and the like. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and an energy storage system. However, the present invention is not limited thereto.

The structure and manufacturing method of the device are well known in the art to which the present invention pertains, and thus a detailed description thereof will be omitted.

BRIEF DESCRIPTION OF DRAWINGS

FIG. 1 is a vertical sectional view showing a pouch-shaped battery case according to an embodiment of the present invention.

FIG. 2 is a vertical sectional view showing a pouch-shaped battery case according to another embodiment of the present invention.

FIG. 3 is a vertical sectional view showing a pouch-shaped battery case according to another embodiment of the present invention.

FIG. 4 is a vertical sectional view showing a pouch-shaped battery case according to another embodiment of the present invention.

FIG. 5 is a vertical sectional view showing a pouch-shaped battery case according to another embodiment of the present invention.

FIG. 6 is a vertical sectional view showing a pouch-shaped battery case according to another embodiment of the present invention.

FIG. 7 is a vertical sectional view showing a pouch-shaped battery case according to a further embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

FIGS. 1 and 2 are vertical sectional views schematically showing pouch-shaped battery cases, each of which includes a metal barrier layer having an adhesive layer disposed therein.

Referring to FIGS. 1 and 2, a pouch-shaped battery case 100 is configured to have a structure in which an outer coating layer 101, a metal barrier layer 110, and an inner sealant layer 104 are sequentially stacked and in which an adhesive layer 105 is interposed between the outer coating layer 101 and the metal barrier layer 110. The metal barrier layer 110 is configured to have a structure in which a first metal layer 102 and a second metal layer 103, which are stacked in the thickness direction, are coupled to each other in the state in which an adhesive layer 105 is interposed therebetween.

A pouch-shaped battery case 200 is configured to have a structure in which an outer coating layer 201, a metal barrier layer 210, and an inner sealant layer 204 are sequentially stacked and in which an adhesive layer 205 is interposed between the outer coating layer 201 and the metal barrier layer 210. The metal barrier layer 210 is configured to have a structure in which a first metal layer 202, a second metal layer 203, and another first metal layer 202 are stacked in the vertical direction and in which each first metal layer 202 and the second metal layer 203 are coupled to each other in the state in which an adhesive layer 205 is interposed therebetween.

FIGS. 3 to 7 are vertical sectional views schematically showing pouch-shaped battery cases, each of which includes a metal barrier layer having a clad structure.

Referring to FIGS. 3 to 7, a pouch-shaped battery case 300 is configured to have a structure in which an outer coating layer 301, a metal barrier layer 310, and an inner sealant layer 304 are sequentially stacked. The metal barrier layer 310 is configured to have a structure in which a first metal 302 and a second metal 303 are stacked in the thickness direction and are arranged in the state of being joined to each other.

The pouch-shaped battery case 300 is configured to have a structure in which an adhesive layer 305 is interposed between the outer coating layer 301 and the metal barrier layer 310. Depending on the circumstances, however, the adhesive layer 305 may be omitted.

A pouch-shaped battery case 400 is configured to have a structure in which an outer coating layer 401, a metal barrier layer 410, and an inner sealant layer 404 are sequentially stacked. The metal barrier layer 410 is configured to have a structure in which a first metal 402, a second metal 403, and another first metal 402 are stacked in the thickness direction and are arranged in the state of being joined to each other.

The pouch-shaped battery case 400 is configured to have a structure in which an adhesive layer 405 is interposed between the outer coating layer 401 and the metal barrier layer 410. Depending on the circumstances, however, the adhesive layer 405 may be omitted.

A pouch-shaped battery case 500 is configured to have a structure in which an outer coating layer 501, a metal barrier layer 510, and an inner sealant layer 504 are sequentially stacked in the vertical direction. The metal barrier layer 510 is configured to have a structure in which first metals 502 and second metals 503 are alternately arranged in the state of being joined to each other in the width direction, which is perpendicular to the thickness direction. The width or the number of the first metals 502 and the second metals 503 may be selectively changed as needed.

A pouch-shaped battery case 600 is configured to have a structure in which an outer coating layer 601, a metal barrier layer 610, and an inner sealant layer 604 are sequentially stacked in the vertical direction. The metal barrier layer 610 is configured to have a structure in which recesses are formed in the surface of a first metal 602 and in which a second metal 603 is disposed in each of the recesses. The size or the number of the recesses may be selectively changed as needed.

A pouch-shaped battery case 700 is configured to have a structure in which an outer coating layer 701, a metal barrier layer 710, and an inner sealant layer 704 are sequentially stacked in the vertical direction. The metal barrier layer 710 is configured to have a structure in which slits are formed in a first metal 702 and in which a second metal 703 is disposed in each of the slits. The size or the number of the slits may be selectively changed as needed.

As described above, the pouch-shaped battery case according to the present invention includes a metal barrier layer, wherein the metal barrier layer includes a first metal that exhibits high formability and a second metal that exhibits high rigidity. Consequently, it is possible to improve both the formability and rigidity of the battery case.

Those skilled in the art to which the present invention pertains will appreciate that various applications and modifications are possible based on the above description, without departing from the scope of the present invention.

INDUSTRIAL APPLICABILITY

As is apparent from the above description, the pouch-shaped battery case according to the present invention includes an outer coating layer for protecting a battery cell from the outside, a metal barrier layer located inside the outer coating layer, and an inner sealant layer located inside the metal barrier layer, wherein the metal barrier layer includes a first metal that exhibits high formability and a second metal that exhibits high rigidity. Consequently, the formability of the battery case is improved due to the ductility of the first metal, and the rigidity of the battery case is improved due to the rigidity of the second metal. Even when mechanical stress is applied to the battery case, therefore, it is possible to prevent the battery case from being broken and to improve the sealability of the battery case.

The invention claimed is:

1. A battery cell having an electrode assembly received in a pouch-shaped battery case together with an electrolytic solution, the electrode assembly having a separator interposed between a positive electrode and a negative electrode, the pouch-shaped battery case comprising:
   an outer coating layer defining an outer surface of the battery case and configured to protect the electrode assembly from an outside of the battery case, the outer coating layer being made of a polymer resin;
   a metal barrier layer located between the outer coating layer and an inner surface of the battery case, the metal barrier layer having high moisture-blocking efficiency and high thermal conductivity; and
   an inner sealant layer located between the metal barrier layer and the inner surface of the battery case, the inner sealant layer being made of a polymer resin that has high thermal fusibility,
   wherein the metal barrier layer comprises a first metal that has high formability and a second metal that has high rigidity, and
   wherein an entirety of the metal barrier layer includes a first metal layer comprising the first metal and a second metal layer comprising the second metal, the first metal layer and the second metal layer being coextensive and touching over an entire extent of the pouch-shaped battery case.

2. The battery cell according to claim 1, wherein the first metal is aluminum or an aluminum alloy, and the second metal is a stainless-steel-based material.

3. The battery cell according to claim 1, further comprising an adhesive layer is interposed between the first metal layer and the second metal layer.

4. The battery cell according to claim 1, wherein the metal barrier layer has a clad structure in which the first metal and the second metal are joined to each other by rolling.

5. The battery cell according to claim 4, wherein first metal and the second metal are stacked in a thickness direction of the battery case and are joined to each other, the thickness direction extending between the outer surface and the inner surface.

6. The battery cell according to claim 4, wherein the metal barrier layer includes upper and lower first layers of the first metal joined to upper and lower surfaces of the second metal, respectively.

7. A pouch-shaped battery case configured to receive an electrode assembly having a separator interposed between a positive electrode and a negative electrode, together with an electrolytic solution, the pouch-shaped battery case comprising:
   an outer coating layer defining an outer surface of the battery case and configured to protect the electrode assembly from an outside of the battery case, the outer coating layer being made of a polymer resin;
   a metal barrier layer located between the outer coating layer and an inner surface of the battery case, the metal barrier layer having high moisture-blocking efficiency and high thermal conductivity; and
   an inner sealant layer located between the metal barrier layer and the inner surface of the battery case, the inner sealant layer being made of a polymer resin that has high thermal fusibility,
   wherein the metal barrier layer comprises a first metal that has high formability and a second metal that has high rigidity, and
   wherein the metal barrier layer includes a plurality of first layers of the first metal and a plurality of second layers of the second metal, the first layers being alternately interleaved with the second layers in a width direction of the battery case, the width direction being perpendicular to a thickness direction of the battery case that extends between the outer surface and the inner surface.

8. A pouch-shaped battery configured to receive an electrode assembly having a separator interposed between a positive electrode and a negative electrode, together with an electrolytic solution, the pouch-shaped battery case comprising:
   an outer coating layer defining an outer surface of the battery case and configured to protect the electrode assembly from an outside of the battery case, the outer coating layer being made of a polymer resin;

a metal barrier layer located between the outer coating layer and an inner surface of the battery case, the metal barrier layer having high moisture-blocking efficiency and high thermal conductivity; and an inner sealant layer located between the metal barrier layer and the inner surface of the battery case, the inner sealant layer being made of a polymer resin that has high thermal fusibility, wherein the metal barrier layer comprises a first metal that has high formability and a second metal that has high rigidity, and wherein the metal barrier layer has a structure in which a recess or a slit is formed in a surface of a first layer comprising the first metal and the second metal is disposed in the recess or the slit.

9. The battery cell according to claim 1, further comprising an adhesive layer interposed between the outer coating layer and the metal barrier layer and/or between the metal barrier layer and the inner sealant layer.

10. A battery cell having an electrode assembly received in the pouch-shaped battery case according to claim 7 together with the electrolytic solution.

11. The battery cell according to claim 1, wherein the inner sealant layer defines the inner surface of the battery case.

* * * * *